US008135328B2

(12) United States Patent
Mochizuki et al.

(10) Patent No.: US 8,135,328 B2
(45) Date of Patent: Mar. 13, 2012

(54) CLEANING BLADE

(75) Inventors: Kenichi Mochizuki, Ushiku (JP); Shoji Inoue, Ushiku (JP); Taku Hatanaka, Moriya (JP)

(73) Assignee: Canon Kasei Kabushiki Kaisha, Tsukuba-shi (JP)

( * ) Notice: Subject to any disclaimer, the term of this patent is extended or adjusted under 35 U.S.C. 154(b) by 393 days.

(21) Appl. No.: 12/051,457

(22) Filed: Mar. 19, 2008

(65) Prior Publication Data

US 2008/0260440 A1 Oct. 23, 2008

(30) Foreign Application Priority Data

Apr. 18, 2007 (JP) ................................ 2007-109126

(51) Int. Cl.
*G03G 21/00* (2006.01)
*C08G 18/38* (2006.01)

(52) U.S. Cl. ......................................... 399/350; 521/94

(58) Field of Classification Search .................. 399/350; 528/82, 422; 521/94–95
See application file for complete search history.

(56) References Cited

U.S. PATENT DOCUMENTS

| | | | | |
|---|---|---|---|---|
| 6,002,911 | A * | 12/1999 | Suzuki et al. | 399/350 |
| 6,703,472 | B2 | 3/2004 | Miura et al. | |
| 2002/0192430 | A1* | 12/2002 | Miura et al. | 428/157 |
| 2006/0229425 | A1* | 10/2006 | Inoue et al. | 528/44 |

FOREIGN PATENT DOCUMENTS

JP 7-290603 A 11/1995

* cited by examiner

*Primary Examiner* — David Gray
*Assistant Examiner* — Billy J Lactaoen
(74) *Attorney, Agent, or Firm* — Fizpatrick, Cella, Harper & Scinto

(57) ABSTRACT

A cleaning blade is provided which does not cause contamination of other parts even when being stored for a long period of time in a high temperature and high humidity environment. The cleaning blade is set in an image forming apparatus employing an electrostatic transfer process, including a blade member and a support member to rub and remove residual toner remaining on a photosensitive drum provided to the image forming apparatus, in which the total amount of nitrogen-containing compounds extracted with methanol from the cleaning blade is 12 μg or less per cm of the cleaning blade in its longitudinal direction.

1 Claim, 2 Drawing Sheets

CLEANING BLADE

BACKGROUND OF THE INVENTION

1. Field of the Invention

The present invention relates to a cleaning blade which is set in an image forming apparatus employing an electrostatic transfer process and which includes a blade member and a support member to rub and remove residual toner remaining on a photosensitive drum provided to the image forming apparatus.

The image forming apparatus employing an electrostatic transfer process, such as an electrophotographic copying machine, a laser beam printer and a facsimile, performs copying and printing by adhering toner to an electrostatic latent image formed on a photosensitive drum, and then transferring the toner image to copying paper. As a method of removing residual toner remaining on the photosensitive drum after transferring the toner image, a method has been put into practical use, which employs a cleaning blade having a blade member formed of urethane elastomer and a support member (holder).

2. Description of the Related Art

Conventionally, as a material forming such a blade member, a polyester urethane elastomer, particularly a thermosetting urethane elastomer, has been used which is excellent in mechanical strength such as abrasion resistance and is less likely to creep (permanent deformation due to contact stress).

The above-mentioned polyester urethane elastomer is usually produced by a prepolymer method, a semi one-shot method, a one-shot method, etc., using polyisocyanate, polyol, a chain extender, and a catalyst. In this production, a catalyst is added for shortening a molding cycle and improving production efficiency of the blade member. Conventionally, as such a catalyst, triethylenediamine (TEDA), dimethylimidazole (DMI), etc., have been used. However, the polyester urethane elastomer produced using the catalyst has such a problem that the above-mentioned catalyst remaining inside is vaporized by moisture in the air or heat, resulting in contamination of other parts. Then, as a result of other parts being contaminated by the above-mentioned catalyst, image defects may occur.

As a means for solving the problem, a case has been introduced in which a catalyst is used having 2 or 3 hydroxyl groups in a molecule (e.g., see Japanese Patent Application Laid-Open No. H07-290603). When a catalyst having such a feature is used, the hydroxyl groups contained in a molecule react with isocyanate contained in a prepolymer. Therefore, the catalyst can be prevented from exuding out of urethane elastomer. However, even when the catalyst has hydroxyl groups in a molecule, not all the hydroxyl groups react with isocyanate in a prepolymer. In such a case, an unreacted catalyst may be exuded out of urethane elastomer by moisture in the air or heat.

Since image forming apparatuses are miniaturized and are improved in image quality with the spread of an electrophotographic copying machine or a laser beam printer, a positional relationship with other parts becomes closer than before, or a space around a cleaning blade decreases. Therefore, even when the amount of the catalyst vaporized by moisture in the air or heat is small, other parts are liable to be contaminated, which results in a condition that image defects are likely to occur.

SUMMARY OF THE INVENTION

The present invention has been made in view of the above-mentioned present circumstances, and is aimed at providing a cleaning blade which does not cause contamination of other parts even when the cleaning blade is stored for a long period of time in a high temperature and high humidity environment.

The present invention which has solved the above problem is a cleaning blade which is set in an image forming apparatus employing an electrostatic transfer process, including a blade member and a support member to rub and remove residual toner remaining on a photosensitive drum provided to the image forming apparatus, in which the total amount of nitrogen-containing compounds extracted with methanol from the cleaning blade is 12 μg or less per cm of the cleaning blade in its longitudinal direction.

Further features of the present invention will become apparent from the following description of exemplary embodiments.

Figure 1:
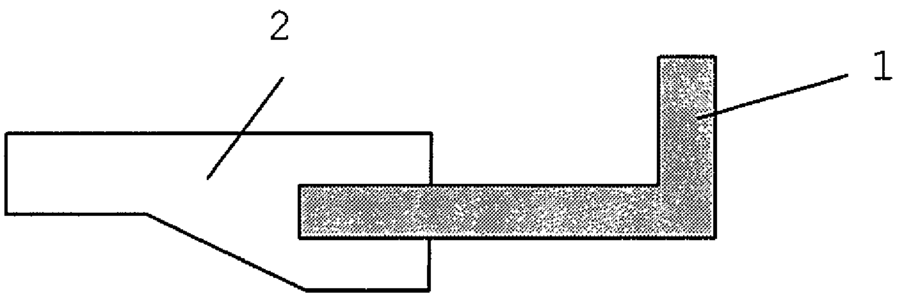
FIG. 1 is a schematic cross-sectional view illustrating an example of an embodiment according to the present invention.
Figure 2:
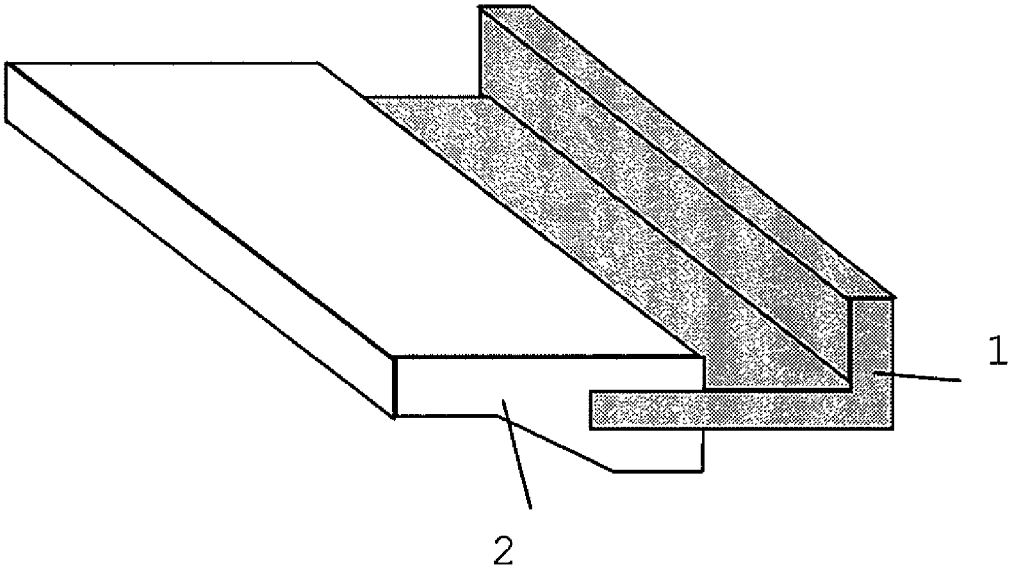
FIG. 2 is a schematic perspective view illustrating an example of an embodiment according to the present invention.
Figure 3:
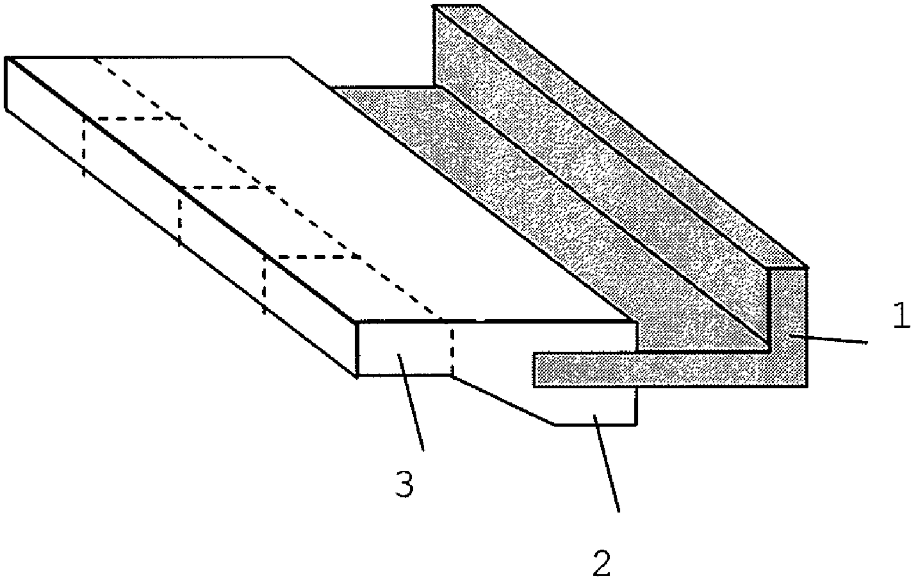
FIG. 3 is a schematic perspective view illustrating an example of a cutting position of a blade member to obtain a test sample according to the present invention.
Figure 4:
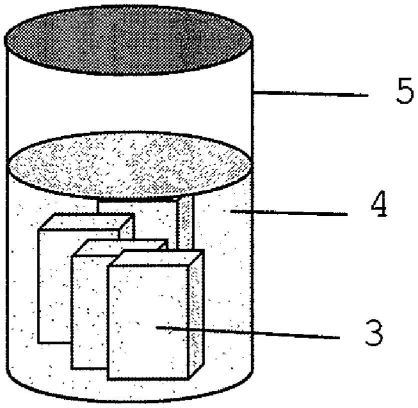
FIG. 4 is a schematic perspective view illustrating an example of a methanol extraction method according to the present invention.

| DESCRIPTION OF SIGNS | |
|---|---|
| 1: | a support member |
| 2: | a blade member |
| 3: | a test sample |
| 4: | methanol |
| 5: | a closed container |

DESCRIPTION OF THE EMBODIMENTS

The present invention can provide a cleaning blade in which other parts are not contaminated by an unreacted catalyst.

The cleaning blade of the present invention is set in an image forming apparatus employing an electrostatic transfer process, and includes a blade member a support member to rub and remove residual toner remaining on a photosensitive drum provided to the image forming apparatus. The cleaning blade has such a feature that the total amount of nitrogen-containing compounds extracted with methanol from the cleaning blade is 12 μg or less per cm of the cleaning blade in its longitudinal direction.

A method of producing the cleaning blade of the present invention is not limited to some specific method, and it can be produced by any known method. For example, the cleaning blade of the present invention can be produced as follows. That is, a support member is prepared, and an adhesive is applied to one end face of the support member. Then, the support member with the adhesive is placed in, for example, a cleaning blade molding die formed of an upper die and a lower die. In this case, the support member is placed in the molding die in a state that the one end face with the adhesive applied thereto is projected into a cavity. Subsequently, a liquid raw material composition containing polyisocyanate, polyol, a chain extender, a urethane curing catalyst, etc., is injected into a cavity of the cleaning blade molding die, and heated to be cured. Subsequently, the cured material is released from the die, and cut into a given size, thereby producing a cleaning blade in which the blade member is formed on a holder member.

In the cleaning blade of the present invention, the total amount of nitrogen-containing compounds extracted with methanol from the cleaning blade is required to be 12 μg or less per cm of the cleaning blade in its longitudinal direction. When the total amount of nitrogen-containing compounds extracted with methanol is larger than 12 μg per cm of the cleaning blade in its longitudinal direction, other parts may be contaminated, which leads to the occurrence of image defects. As other parts which are disposed near the cleaning blade, for example, a photosensitive drum and a charged roller are cited. The longitudinal direction of each of the parts and the longitudinal direction of the cleaning blade are the same. Thus, when other parts are contaminated by the cleaning blade, the total amount of nitrogen-containing compounds which exude per cm of the cleaning blade in its longitudinal direction serves as an important index.

Moreover, when the blade member is formed of a urethane elastomer, the total amount of nitrogen-containing compounds extracted from the urethane elastomer with methanol is preferably equal to or smaller than 50 μg per g of the urethane elastomer. When the total amount of nitrogen-containing compounds extracted with methanol is adjusted to be equal to or smaller than 50 μg per g of the urethane elastomer, the above-mentioned contamination of other parts can be prevented.

Thus, according to the cleaning blade of the present invention, other parts are not contaminated, and hence, image defects do not occur, because the total amount of nitrogen-containing compounds which exude from the cleaning blade is adjusted to a suitable value.

As for polyisocyanates which may be used in the present invention, there is no specific limitation, but 4,4'-diphenylmethanediisocyanate (MDI) is preferred, and the following polyisocyanates may be also used: for example, isophorone diisocyanate, 4,4'-dicyclohexyl diisocyanate, trimethylhexamethylene diisocyanate, tolylene diisocyanate, carbodiimide-modified diisocyanate, polymethylenephenyl polyisocyanate, o-toluidine diisocyanate, naphthalene diisocyanate, xylylene diisocyanate, hexamethylene diisocyanate, p-phenylene diisocyanate, lysine diisocyanate methyl ester. Those may be used alone or in combination.

As for polyols which may be used in the present invention, there is no specific limitation, and for example, conventionally known polyols may be used. Specifically, the following may be cited: adipate-type polyesterpolyols such as polyethyleneadipate polyesterpolyol, polybutyleneadipate polyesterpolyol, polyhexyleneadipate polyesterpolyol, polyethylene-propyleneadipate polyesterpolyol, polyethylene-butyleneadipate polyesterpolyol, and polyethylene-neopentyleneadipate polyesterpolyol. In addition, polyesterpolyols such as a polycaprolactone-type polyesterpolyol obtained by a ring opening polymerization of caprolactone, polyethyleneglycol, polypropyleneglycol and polytetramethylene glycol, may be cited. Polycarbonate diols may also be used. These may be used alone or in combination.

As for chain extenders which may be used in the present invention, there is no specific limitation, and for example, conventionally known polyols may be used. Specifically, the following may be cited: polyols each having a molecular weight of 200 or less, such as 1,4-butanediol, ethyleneglycol, diethyleneglycol, propyleneglycol, dipropyleneglycol, hexanediol, 1,4-cyclohexanediol, 1,4-cyclohexanedimethanol, xylyleneglycol, triethyleneglycol, trimethylolpropane, glycerine, pentaerythritol, sorbitol and 1,2,6-hexanetriol. These may be used alone or in combination.

As urethane curing catalysts usable in the present invention, amine compounds such as tertiary amines, organometallic compounds, etc., may be cited. The urethane curing catalyst is roughly classified into an isocyanuration catalyst and an urethanization catalyst. In the present invention, it is preferable that an isocyanuration catalyst and an urethanization catalyst are used in combination as the urethane curing catalyst.

The isocyanuration catalyst usable in the present invention includes tertiary amines such as N-ethylpiperidine, N,N'-dimethylpiperazine, and N-ethyl morpholine; hydroxides or organic weak acid salts of tetraalkylammonium such as tetramethylammonium, tetraethylammonium, and tetrabutylammonium; hydroxides or organic weak acid salts of hydroxyalkylammonium such as trimethyl hydroxypropyl ammonium and triethyl hydroxypropyl ammonium; alkaline metal salts of carboxylic acids such as acetic acid, propionic acid, butyric acid, caproic acid, capric acid, valeric acid, octylic acid, myristic acid, and naphthenic acid. Of those, alkaline metal salts of carboxylic acids are preferable which do not bring about blooming after molding so as not to exert an influence on other parts. Those may be used alone or in combination.

As the urethanization catalyst usable in the present invention, commonly-used polyurethane curing catalysts may be cited. For example, amine catalysts may be cited. To be specific, the following can be mentioned: amino alcohols such as dimethylethanolamine and N,N,N'-trimethyl-2-hydroxyethyl propylenediamine; trialkylamines such as triethylamine; tetraalkyl diamines such as N,N,N',N'-tetramethyl-1,3-butanediamine; cyclic amines such as triethylenediamine, 1,8-diazabicyclo(5,4,0)undecene-7, and N-methyl morpholine; a piperazine-type amine; a triazine-type amine; an imidazole-type amine; etc. Moreover, metal catalysts, which are generally used for urethane, may be used, and dibutyl tin dilaurate may be cited as an example. Of those, the amino alcohol having in its molecule an active hydrogen group for isocyanate is preferable, taking into account its reactivity and the fact that it does not have an influence on other parts after molding. N,N-dimethylhexanolamine having high reactivity between an active hydrogen group in its molecule and isocyanate is more preferable. Those may be used alone or in combination.

As for a method of producing the cleaning blade of the present invention, there is no specific limitation, and it may be suitably selected from known methods. For example, the cleaning blade can be produced as follows. First, a cleaning blade molding die is prepared. Next, a chain extender containing a prepolymer for a urethane elastomer in which a polyisocyanate and a polyester polyol are partially polymerized and a catalyst is put in a casting machine, and then mixed and stirred at a given ratio in a mixing chamber, thereby obtaining a liquid mixture. The liquid mixture is put in the molding die, and then, reacted and cured. Subsequently, the cured material is released from the die, and cut into a given size, thereby producing a cleaning blade.

Next, the present invention will be described in detail with reference to examples. The present invention is by no means limited to these examples.

The following raw materials were used in examples.

(1) 4,4-diphenylmethane diisocyanate (MILLIONATE MT (trade name) manufactured by NIPPON POLYURETHANE INDUSTRY CO., LTD)

(2) Polybutyleneadipate (NIPPORAN4010 (trade name) manufactured by NIPPON POLYURETHANE INDUSTRY CO., LTD)

(3) Polyhexyleneadipate (NIPPORAN164 (trade name) manufactured by NIPPON POLYURETHANE INDUSTRY CO., LTD)

(4) 1,4-butanediol (manufactured by Mitsubishi Chemical Corporation)

(5) Trimethylolpropane (manufactured by MITSUBISHI GAS CHEMICAL COMPANY, INC)

(6) N,N-dimethylaminohexanol (KAOLIZER No. 25 (trade name) manufactured by KAO CORPORATION)

(7) N,N,N'-trimethyl-2-hydroxyethylpropylenediamine (POLYCAT17 (trade name) manufactured by Air Products and Chemicals, Inc.)

Example 1

Preparation of a Thermosetting Polyurethane Raw Material Composition 27.6 parts by mass of the above-mentioned 4,4'-diphenylmethane diisocyanate (1) and 57.6 parts by mass of polybutylene adipate (2) (number average molecular weight: 2,000) were reacted at 80° C. for 120 minutes in a nitrogen atmosphere, thereby obtaining a prepolymer. Moreover, 2.1 parts by mass of 1,4-butanediol (4), 1.7 parts by mass of trimethylolpropane (5), 11.8 parts by mass of polyhexylene adipate (3) (number average molecular weight: 1,000), and a catalyst shown in Table 1 were mixed, thereby obtaining a curing agent.

(Production of a Cleaning Blade)

A sheet steel holder was prepared beforehand as a support member. A phenol resin adhesive was applied to one end face of the holder. The holder is placed in a cleaning blade molding die formed of an upper die and a lower die in a state that the one end portion to which the adhesive has been applied is projected into a cavity. Next, a thermosetting polyurethane raw material composition prepared by mixing the prepolymer and the curing agent was injected into the cavity. Then, the raw material composition was allowed to react and cured by heating at 130° C. Subsequently, the cured material was released from the die, and cut into a given size, thereby producing a cleaning blade in which the blade member was formed on the holder.

(Quantitative Determination of Nitrogen-Containing Compound)

The cleaning blade was immersed in methanol, and extraction was performed for four days in an environment of 25° C. Subsequently, the cleaning blade was taken out, and then the methanol used for the extraction was condensed using a rotary evaporator, thereby obtaining a concentrate. Next, the methanol was added to the concentrate using a measuring flask, thereby preparing a given amount of a test sample. 1 μL of the test sample was analyzed by GC-MS. The detected nitrogen-containing compounds were identified from the obtained mass spectrum, thereby calculating the peak area of each nitrogen-containing compound.

In addition, each of the nitrogen-containing compounds detected in the above analysis was separately prepared, thereby obtaining methanol solutions whose concentrations were adjusted to be different from each other. 1 μL of each of the methanol solutions thus obtained whose concentration was known was analyzed by GC-MS, thereby preparing a calibration curve on the basis on the resulting peak areas.

Based on the prepared calibration curve, the concentration of each of the nitrogen-containing compounds contained in the test sample was calculated, and then the total amount of the nitrogen-containing compounds extracted from the cleaning blade was calculated. Further, the total amount of elution of the nitrogen-containing compounds per cm of the cleaning blade in its longitudinal direction was calculated by dividing the total amount of the extracted nitrogen-containing compounds by the length (cm) of the cleaning blade in its longitudinal direction. The obtained results are shown in Table 1.

The urethane elastomer formed as a blade member of the cleaning blade was cut out, thereby obtaining a test sample. The test sample was treated and analyzed in the same manner as in the cleaning blade, thereby calculating the total amount of extracted nitrogen-containing compounds. The total amount of the extracted nitrogen-containing compounds was divided by the weight (g) of the urethane elastomer test sample used for extraction, to thereby calculate the total amount of elution of the nitrogen-containing compound per g of urethane elastomer. The obtained results are shown in Table 1.

N,N-dimethylaminohexanol was extracted as the nitrogen-containing compound.

(Image Evaluation)

The obtained cleaning blade was installed in a toner cartridge (laser beam printer LBP-5300, manufactured by Canon Inc.). This laser beam printer was left standing for 30 days in an environment of 50° C./95% RH, and thereafter, an image was formed in an environment of 15° C./30% RH. The image thus formed was visually observed, and then was evaluated according to the following criteria:

A: no abnormalities were observed in the obtained image;

B: a slightly whitened portion was observed in the obtained image, and the slightly whitened portion corresponded to the position in contact with the cleaning blade of a drum or the position facing the cleaning blade of a charging roller; and C: a clear white streak was observed in the obtained image, and the white streak portion corresponded to the position in contact with the cleaning blade of a drum or the position facing the cleaning blade of a charging roller.

Example 2

A cleaning blade was produced in the same manner as in Example 1 except that the catalyst was used in a proportion shown in Table 1. Then, the amount of the extracted nitrogen-containing compound was calculated, and the image evaluation was performed in the same manner as in Example 1. The obtained results are shown in Table 1.

Moreover, N,N-dimethylaminohexanol was extracted as the nitrogen-containing compound.

Example 3

A cleaning blade was produced in the same manner as in Example 1 except that a catalyst shown in Table 1 was used in a proportion shown in Table 1. Then, the amount of the extracted nitrogen-containing compound was calculated, and the image evaluation was performed in the same manner as in Example 1. The obtained results are shown in Table 1.

Moreover, N,N,N'-trimethyl-2-hydroxyethyl propylenediamine was extracted as the nitrogen-containing compound.

Example 4

A cleaning blade was produced in the same manner as in Example 1 except that a catalyst shown in Table 1 was used in a proportion shown in Table 1. Then, the amount of the extracted nitrogen-containing compound was calculated, and the image evaluation was performed in the same manner as in Example 1. The obtained results are shown in Table 1.

Moreover, N,N,N'-trimethyl-2-hydroxyethyl propylenediamine was extracted as the nitrogen-containing compound.

Comparative Example 1

A cleaning blade was produced in the same manner as in Example 1 except that a catalyst shown in Table 2 was used in a proportion shown in Table 2. Then, the amount of the extracted nitrogen-containing compound was calculated, and the image evaluation was performed in the same manner as in Example 1. The obtained results are shown in Table 2.

Moreover, N,N,N'-trimethyl-2-hydroxyethyl propylenediamine was extracted as the nitrogen-containing compound.

Comparative Example 2

A cleaning blade was produced in the same manner as in Example 1 except that a catalyst shown in Table 2 was used in a proportion shown in Table 2. Then, the amount of the extracted nitrogen-containing compound was calculated, and the image evaluation was performed in the same manner as in Example 1. The obtained results are shown in Table 2.

Moreover, N,N,N'-trimethyl-2-hydroxyethyl propylenediamine was extracted as the nitrogen-containing compound.

TABLE 1

| | Example 1 | Example 2 | Example 3 | Example 4 |
|---|---|---|---|---|
| Catalyst type | N,N-dimethylamino-hexanol | N,N-dimethylamino-hexanol | N,N,N'-trimethyl-2-hydroxyethyl propylenediamine | N,N,N'-trimethyl-2-hydroxyethyl propylenediamine |
| Catalyst amount (ppm) | 300 | 600 | 300 | 550 |
| Amount of elution of nitrogen-containing compound per cm of cleaning blade in the longitudinal direction (μg/cm) | 0.6 | 1.3 | 5.9 | 11.9 |
| Amount of elution of nitrogen-containing compound per g of urethane elastomer (μg/g) | 2.6 | 5.7 | 25.7 | 50.0 |
| Image evaluation | A | A | A | A |

TABLE 2

| | Comparative Example 1 | Comparative Example 2 |
|---|---|---|
| Catalyst type | N,N,N'-trimethyl-2-hydroxyethyl propylenediamine | N,N,N'-trimethyl-2-hydroxyethyl propylenediamine |
| Catalyst amount (ppm) | 600 | 800 |
| Amount of elution of nitrogen-containing compound per cm of cleaning blade in the longitudinal direction (μg/cm) | 12.7 | 16.8 |
| Amount of elution of nitrogen-containing compound per g of urethane elastomer (μg/g) | 55.7 | 73.7 |
| Image evaluation | B | C |

As is clear from the results shown in Table 1, the cleaning blades produced in Examples 1 to 4 caused no image defect resulting from the contamination of the photosensitive drum and the charging roller. In contrast, the cleaning blades produced in Comparative Examples 1 and 2 causes an image defect. This is probably caused by the nitrogen-containing compound vaporized from the cleaning blade by moisture or heat.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-109126, filed Apr. 18, 2007, which is hereby incorporated by reference herein in its entirety.

What is claimed is:

1. A cleaning blade which is set in an image forming apparatus employing an electrostatic transfer process, comprising a blade member and a support member to rub and remove residual toner remaining on a photosensitive drum provided to the image forming apparatus, wherein the blade member comprises a urethane elastomer containing an amino alcohol having an active hydrogen group, with the amino alcohol having the active hydrogen group including at least N,N-dimethylaminohexanol or N,N,N'-trimethyl-2-hydroxyethylpropylenediamine, and wherein a total amount of the amino alcohol having an active hydrogen group extracted with methanol from 1 gram of the urethane elastomer performed for four days in an environment of 25° C. is 2.6 μg or more and 50.0 μg or less.

* * * * *